(12) United States Patent
Bryant et al.

(10) Patent No.: US 10,943,182 B2
(45) Date of Patent: Mar. 9, 2021

(54) COGNITIVE SCREENING OF EOR ADDITIVES

(71) Applicant: International Business Machines Corporation, Armonk, NY (US)

(72) Inventors: Peter W. Bryant, Rio de Janeiro (BR); Rodrigo Neumann Barros Ferreira, Rio de Janeiro (BR); Ronaldo Giro, Rio de Janeiro (BR); Mathias B. Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 15/469,874

(22) Filed: Mar. 27, 2017

(65) Prior Publication Data

US 2018/0276563 A1    Sep. 27, 2018

(51) Int. Cl.
*G06N 20/00*       (2019.01)
*E21B 43/16*       (2006.01)
(Continued)

(52) U.S. Cl.
CPC .............. *G06N 20/00* (2019.01); *C09K 8/58* (2013.01); *C09K 8/584* (2013.01); *C09K 8/588* (2013.01); *E21B 41/0092* (2013.01); *E21B 43/16* (2013.01); *E21B 49/00* (2013.01); *G06N 5/04* (2013.01); *C09K 2208/10* (2013.01);
(Continued)

(58) Field of Classification Search
CPC .......... E21B 43/16; E21B 43/20; E21B 43/25; E21B 2041/0028; E21B 41/0092; E21B 49/00; E21B 49/875; E21B 47/07; E21B 47/06; E21B 47/10; E21B 49/08; C09K 8/58; C09K 2208/10; C09K 8/584; C09K 8/588; G06F 30/20; G06N 20/00; G06N 5/04

See application file for complete search history.

(56) References Cited

U.S. PATENT DOCUMENTS 7,707,013 B2    4/2010  Valdez et al.
7,784,539 B2    8/2010  Montaron
(Continued)

FOREIGN PATENT DOCUMENTS

WO    2016/066859 A1    5/2016
WO    2017/201025 A1    11/2017

OTHER PUBLICATIONS

Bryant, Peter W., et al., "Cognitive Screening of EOR Additives", U.S. Appl. No. 15/469,874, filed Mar. 27,2017, 28 pgs.
(Continued)

*Primary Examiner* — Paulinho E Smith
(74) *Attorney, Agent, or Firm* — Harrington & Smith (57) ABSTRACT

A machine learning process is performed using one or more sources of information for enhanced oil recovery (EOR) materials to be used for an EOR process on a defined oil reservoir. Performance of the machine learning process produces an output comprising an indication of one or more EOR materials and their corresponding concentrations to be used in the EOR process. The indication of the one or more EOR materials and their corresponding concentrations is output to be used in the EOR process. Methods, apparatus, and computer program products are disclosed.

17 Claims, 6 Drawing Sheets

(51) Int. Cl.
*G06N 5/04* (2006.01)
*E21B 41/00* (2006.01)
*E21B 49/00* (2006.01)
*C09K 8/58* (2006.01)
*C09K 8/584* (2006.01)
*C09K 8/588* (2006.01)
*E21B 47/06* (2012.01)
*E21B 47/10* (2012.01)
*E21B 49/08* (2006.01)
*E21B 47/07* (2012.01)

(52) U.S. Cl.
CPC ............... *E21B 47/06* (2013.01); *E21B 47/07* (2020.05); *E21B 47/10* (2013.01); *E21B 49/08* (2013.01); *E21B 49/0875* (2020.05)

(56) References Cited

U.S. PATENT DOCUMENTS

| | | | |
|---|---|---|---|
| 7,966,164 B2 | 6/2011 | Valdez et al. | |
| 8,046,314 B2 * | 10/2011 | Graf | E21B 44/00 706/15 |
| 8,175,751 B2 * | 5/2012 | Thakur | E21B 43/16 700/266 |
| 8,204,693 B2 | 6/2012 | Briers et al. | |
| 8,311,743 B2 * | 11/2012 | Gurpinar | E21B 43/16 702/6 |
| 8,589,130 B2 * | 11/2013 | Stukan | E21B 43/16 703/6 |
| 8,939,703 B1 | 1/2015 | Lawrence | |
| 9,310,285 B1 * | 4/2016 | Avouris | G01N 21/71 |
| 10,344,584 B2 * | 7/2019 | Anisur Rahman | G01V 11/002 |
| 10,577,907 B2 * | 3/2020 | Conn | E21B 43/2406 |
| 2009/0088924 A1 | 4/2009 | Coffee et al. | |
| 2012/0053920 A1 * | 3/2012 | Rai | G01V 9/00 703/10 |
| 2012/0150519 A1 * | 6/2012 | Bang | E21B 43/16 703/10 |
| 2012/0330553 A1 * | 12/2012 | Mollaei | E21B 43/16 702/11 |
| 2014/0067347 A1 * | 3/2014 | Gurpinar | G06F 30/20 703/2 |
| 2015/0284811 A1 * | 10/2015 | Knight | E21B 47/1015 506/2 |
| 2016/0063150 A1 * | 3/2016 | Safonov | E21B 25/00 703/10 |
| 2017/0174978 A1 * | 6/2017 | Giro | E21B 43/16 |
| 2017/0286802 A1 | 10/2017 | Mezghani et al. | |
| 2018/0202264 A1 * | 7/2018 | Sarduy | E21B 49/008 |
| 2018/0252076 A1 * | 9/2018 | Bryant | E21B 41/0092 |
| 2018/0363031 A1 * | 12/2018 | Becares | G16B 40/00 |

OTHER PUBLICATIONS

Kamari, Arash, et al., "Efficient screening of enhanced oil recovery methods and predictive economic analysis", Neural Comput. & Applic., Feb. 2014, 10 pgs.

Kang, Pan-Sang, et al., "Screening Criteria and Considerations of Offshore Enhanced Oil Recovery", Energies, Jan. 2016, 19 pgs.

Taber, J.J., et al., "EOR Screening Cireteria Revisited—Part 1: Introduction to Screening Criteria and Enhanced Recovery Field Projects", SPE Reservoir Engineering, Aug. 1997, pp. 189-198.

Taber, J.J., et al., "EOR Screening Criteria Revisited—Part 2: Applications and Impact of Oil Prices", SPE Reservoir Engineering, Aug. 1997, pp. 199-205.

Aladasani, Ahmad, "Updated EOR screening criteria and modeling the impacts of water salinity changes on oil recovery", Missouri S&T, 2012, 260 pgs.

Negin, Chegenizadeh, et al., "Most common surfactants employed in chemical enhanced oil recovery", Petroleum 3, 2017, pp. 197-211.

Siena, Martina, et al., "A Novel EOR Screening Approach Based on Bayesian Clustering and Principal Component Analysis", SPE, 2016, 29 pgs.

Moreno, Jaime, et al., "EOR Advisor System: A Comprehensive Approach to EOR Selection", IPTC-17798-MS, 2014, 13 pgs.

Ambrosio, Jacquelyn (editor), "Handbook on Oil Production Research", Nova Science Publishers, Inc., 2014, 20 pgs.

Trujillo, M., et al., "Selection Methodology for Screening Evaluation of Enhanced-Oil-Recovery Methods", SPE, 2010, 11 pgs.

Zhang, Qi-Qi, et al., "Novel Zwitterionic Surfactant Derived from Castor Oil and Its Performance Evaluation for Oil Recovery", Colloids and Surfaces A: Physicochemical and Engineering Aspects, 2015, 42 pgs.

Van den Berg, Sven, "Demand-to-Train Allocation in a Hub-and-Spoke Network", https://thesis.eur.nl/pub/17105/vandenBerg.pdf; Oct. 3, 2014, 71 pgs.

Zurheide, Sebastian, et al., "A Revenue Management Slot Allocation Model for Liner Shipping Networks", https://link.springercom/article/1057/mel.2012.11, Aug. 23, 2012, 7 pgs.

* cited by examiner

COGNITIVE SCREENING OF EOR ADDITIVES

BACKGROUND

This invention relates generally to enhanced oil recovery (EOR) additives and their use and, more specifically, relates to screening EOR materials that are suitable for specific oil reservoirs and possibly based on World Wide Web (WWW) search analyses and/or microfluidic experimental tests.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations and acronyms used in this document and/or the drawings are defined below, prior to the claims.

Primary and secondary oil recovery typically extracts no more than 10% to 40% of the original-oil-in-place (OOIP). Since most of the oil reservoirs are becoming older, tertiary methods called Enhanced Oil Recovery (EOR) methods have started to be employed to extract the remained oil from the reservoir. For instance, as of 2015, one document lists a total of 456 cases of successful EOR applications (where 437 were onshore and 19 were offshore). See Pan-Sang Kang et al., "Screening Criteria and Considerations of Offshore Enhanced Oil Recovery", Energies 9(1):44 (January 2016).

There are a number of different techniques for EOR, including chemical, gas, and thermal EOR. See also Pan-Sang Kang et al., "Screening Criteria and Considerations of Offshore Enhanced Oil Recovery", Energies 9(1):44 (January 2016). In particular, this reference analyzed cases of successful EOR for onshore and offshore applications. Such EOR methods or process could include polymer flooding, surfactant flooding, alkaline flooding, nanoparticle flooding or a combination of these, such as ASP: alkaline, surfactant and polymer flooding.

BRIEF SUMMARY

This section is intended to include examples and is not intended to be limiting.

In an exemplary embodiment, a method comprises performing a machine learning process using one or more sources of information for enhanced oil recovery (EOR) materials to be used for an EOR process on a defined oil reservoir, where performance of the machine learning process produces an output comprising an indication of one or more EOR materials and their corresponding concentrations to be used in the EOR process. The method also comprises outputting the indication of the one or more EOR materials and their corresponding concentrations to be used in the EOR process.

In a further embodiment, a computer system comprises one or more memories having computer readable code and one or more processors. The one or more processors, in response to retrieving and executing the computer readable code, cause the computer system to perform the following: performing a machine learning process using one or more sources of information for enhanced oil recovery (EOR) materials to be used for an EOR process on a defined oil reservoir, where performance of the machine learning process produces an output comprising an indication of one or more EOR materials and their corresponding concentrations to be used in the EOR process; and outputting the indication of the one or more EOR materials and their corresponding concentrations to be used in the EOR process.

An additional exemplary embodiment is a computer program product comprising a computer readable storage medium having program instructions embodied therewith. The program instructions are executable by a computer system to cause the computer system to perform operations comprising: performing a machine learning process using one or more sources of information for enhanced oil recovery (EOR) materials to be used for an EOR process on a defined oil reservoir, where performance of the machine learning process produces an output comprising an indication of one or more EOR materials and their corresponding concentrations to be used in the EOR process; and outputting the indication of the one or more EOR materials and their corresponding concentrations to be used in the EOR process.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Conventional techniques include screening only of EOR processes. Although these screening techniques rank the best possible EOR methods, they do not advise the best EOR materials for each of the EOR processes and do not correlate a material's properties that are responsible for the effectiveness of oil/gas recovery. Thus, one is not able to understand and then to improve those properties when designing new EOR materials. In this document, EOR materials will also be referred to as EOR additives. In particular, there is a lack of a method for screening EOR materials instead of just EOR processes.

As an overview, we propose methods for screening of EOR additives instead of just the EOR process, and at the same time these methods are able to correlate a material's properties that are important to the effectiveness of oil/gas recovery. Advantages of the methods may include one or more of the following:

1) Screening of EOR additives instead of just EOR methods.

2) Correlating an EOR material's properties that are important to the effectiveness of oil/gas recovery.

3) Knowing which of a materials' properties are relevant for a specific reservoir condition, we can in principle improve those properties and then design new improved EOR materials.

4) Improving the design of new materials and at the same time decreasing the time and cost of development.

Now that a broad overview of the exemplary embodiments has been provided, the descriptions of embodiments will be presented in more detail. It is first helpful to review EOR techniques, e.g., as they relate to the exemplary embodiments herein.

Figure 1A:
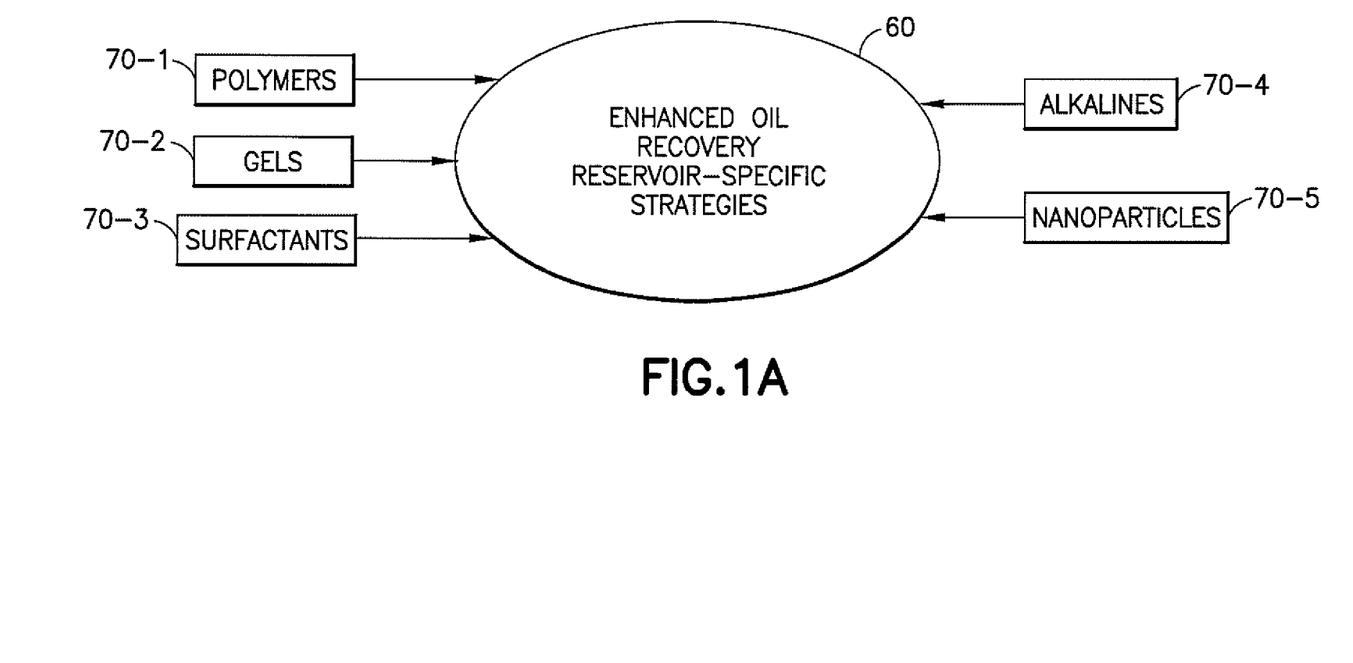
FIG. 1A is an illustration of multiple EOR materials useful for EOR reservoir-specific strategies for a problem for a specific reservoir.

There are many EOR strategies that employ different types of EOR materials 70 (see FIG. 1A), such as polymers (also called polymer flooding) 70-1, gels 70-2, surfactants 70-3, alkalines 70-4, and nanoparticles 70-5. Defining an EOR strategy (from the EOR reservoir-specific strategies 60 in FIG. 1A) that is suitable for a specific reservoir is very important. Even within a class of materials 70, there are still an almost infinite number of possibilities to define a suitable material for a specific reservoir. For example for polymers 70-1, one needs to decide which kinds of polymers are suitable among an enormous combination of physical, chemical and topological characteristics, such as chemical composition, glass transition temperature, melting point, degradability, polymer chain characteristics: linear/non-linear, homopolymer/copolymer, organic/inorganic, and the like.

Use of a cognitive strategy (e.g., based on artificial intelligence methods, machine learning and/or human feedback) could help in screening EOR materials that are suitable for a specific oil reservoir. Furthermore, this strategy could improve the design of new materials and at the same time decrease the time and cost of development. This strategy could establish which material properties are responsible to the effectiveness of EOR. Thus, we can explore those properties, trying to improve them.

For a specific EOR strategy that employs materials (polymer flooding, hydrogels, surfactants, alkaline, and nanoparticles), the cognitive platform will enable us to select a material or a set of materials suitable for a specific oil reservoir and at same time learn what kinds of material properties are important to the effectiveness of oil/gas recovery. In this way we will be able to develop new materials while spending less time doing so.

Figure 1B:
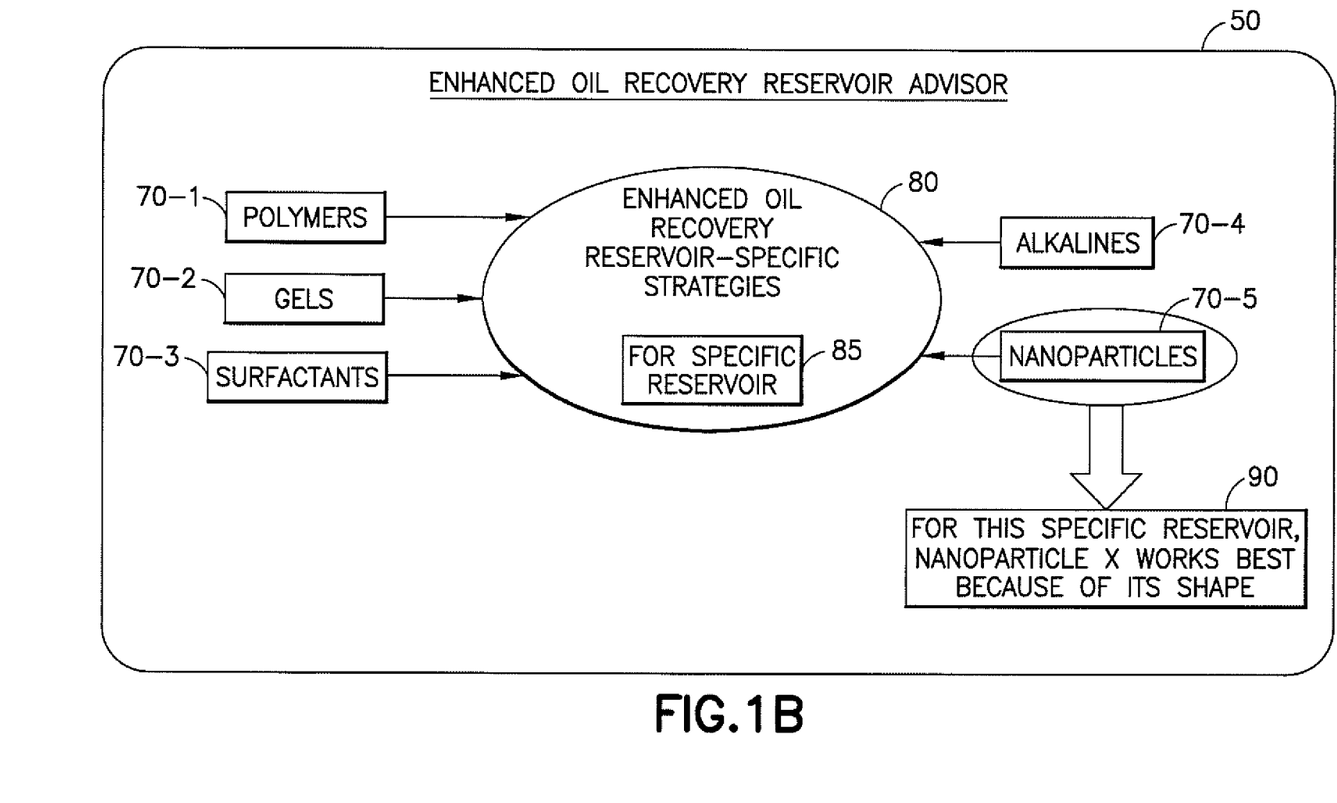
FIG. 1B is an illustration of selecting one of the multiple EOR materials useful for EOR reservoir-specific strategies, based on an exemplary embodiment.

This is illustrated in part by FIG. 1B, where the EOR materials 70 are applied to a specific oil reservoir 85 in the EOR reservoir-specific strategies 80, as performed using an enhanced oil recovery reservoir advisor 50 in accordance with an exemplary embodiment. As indicated by reference 90, for this specific reservoir 85, the nanoparticles 70-5 work best as per the cognitive platform as an EOR material 70. More specifically, the nanoparticle X works best because of its shape. Once this is determined, the options to proceed include using nanoparticle X or designing new nanoparticle shapes based on what the system has discovered.

Certain exemplary embodiments encompass an "Enhanced Oil Recovery Reservoir Advisor" that may use a set of sensors deployed at an oil well or in the field, to monitor physical parameters (flows, temperature, pressure, oil viscosity, water salinity, water pH, oil/water saturation). The EOR reservoir advisor may also use an EOR materials database together with Artificial Intelligence (AI) techniques, such as machine learning, neural network models, principal component analyses, and the like, to produce an indication (e.g., output over a GUI) to an operator selecting EOR materials. Further, the Advisory may direct actuators to provide the materials to the reservoir and/or mix them together.

Figure 2A:
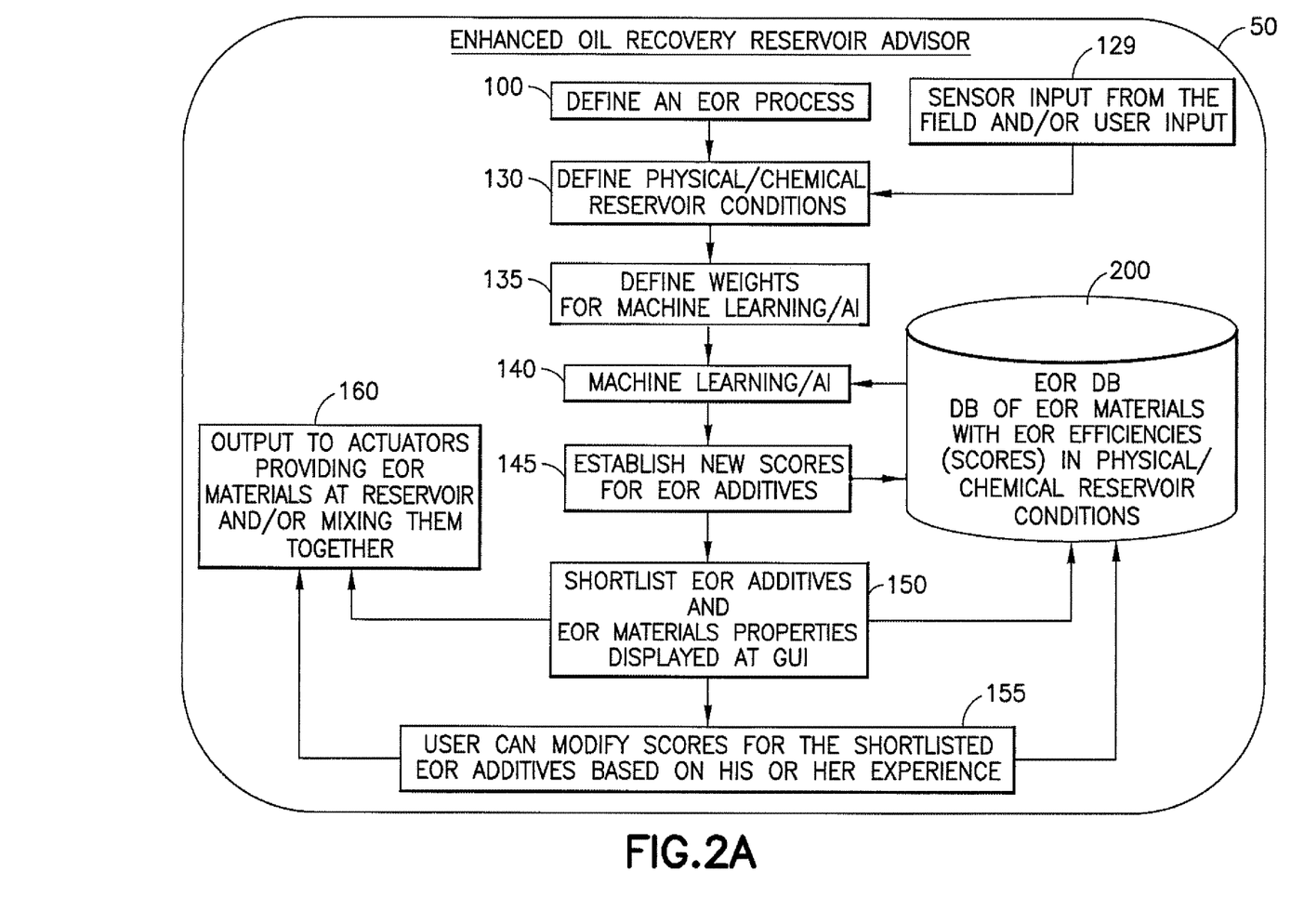
FIG. 2A is a logic flow diagram for operations performed by or using an enhanced oil reservoir advisor, and illustrates the operation of an exemplary method or methods, a result of execution of computer program instructions embodied on a computer readable memory, functions performed by logic implemented in hardware, and/or interconnected means for performing functions in accordance with exemplary embodiments.
Figure 2B:
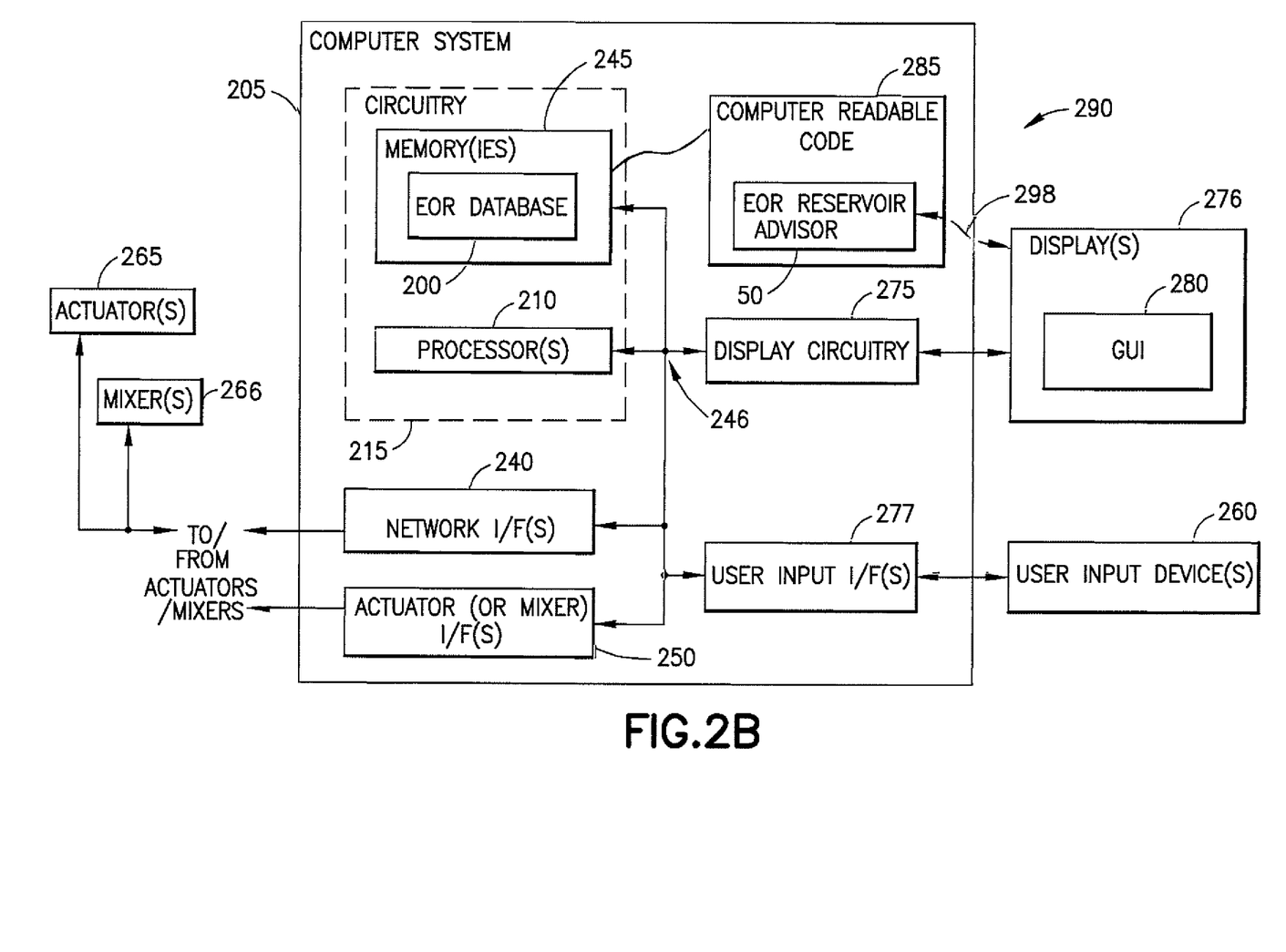
FIG. 2B illustrates a block diagram of possible internal configuration of the elements of a system using the EOR reservoir advisor in FIG. 2A.

Below we describe the exemplary embodiments in more detail. Reference may also be made to FIGS. 2A and FIG. 2B. FIG. 2A includes a logic flow diagram for operations performed by or using an enhanced oil reservoir advisor 50, and illustrates the operation of an exemplary method or methods, a result of execution of computer program instructions embodied on a computer readable memory, functions performed by logic implemented in hardware, and/or interconnected means for performing functions in accordance with exemplary embodiments.

The user, or an automated process such as a computational procedure, selects (in block 100) an EOR process from one of the following options, as a list of possible options: polymer flooding 70-1; hydrogels 70-2; surfactants 70-3; alkalines 70-4; or nanoparticles 70-5. Note that these are examples of options and other options may be added or fewer options may be used. The procedure shown on the respective flow chart should be repeated if the user wants a different EOR process from the previously selected.

The user and/or a set of sensors deployed in the field (such as at the oil well), block 129, helps to define the physical/chemical reservoir conditions, such as rock type formation (lithology), temperature, pressure, permeability, rock topologies information, fluid properties such as oil viscosity, water salinity, pH, oil/water saturation, and the like. This defining occurs in block 130.

The user defines (block 135) weights based on the importance of score types, to be used in machine learning (ML)/artificial intelligence (AI). For instance, for each EOR additive A from the EOR additive Data Base (EOR DB 200), there may be, in an exemplary embodiment, 4 (four) scores associated with the information source's individual effectiveness under specific physical/chemical conditions for a reservoir. The four score types relate the effectiveness based on the following sources of information: (i) World Wide Web (WWW) search analyses, (ii) microfluidics experiments, (iii) AI analyses (such as those described below, e.g., in reference to block 140); and (iv) user feedback. In this way, the machine learning (AI technique) can be trained based on a specific score source, or on multiple sources, each with specific weighting. The weights and the scores can be the same, but usually they are not the same. The idea is to associate different weights for different score's sources based on how trustable are the scores. For example, scores that come from microfluidic experiments should have greater weights than scores from WWW search analyses. Therefore, weights would then weight the scores accordingly. The EOR DB 200 is a DB of EOR materials with corresponding EOR efficiencies in physical/chemical reservoir conditions. In this document, the terms EOR efficiencies and scores are considered to be interchangeable. The EOR efficiencies are directly related with the increase of oil production due to the addition of the EOR materials. The scores could be the same, or something proportional to the EOR efficiencies (e.g., a percentage of the increased oil production). Additionally, while EOR efficiency is typically in terms of production, one can imagine other types of efficiencies, such as cost (e.g., in dollars).

Then the machine learning (e.g., artificial intelligence technique(s)) in block 140 will screen possible EOR additives that are suitable for such reservoir conditions. Concerning machine learning (ML) and AI, these terms are used interchangeably in this document. Depending on whose definitions are used, ML may be a subset of AI or may be a discipline separate from but related and similar to the discipline of AI. For instance, it is believed that AI is the broad definition of any learning that is performed by a machine. In that sense, machine learning is a subset of AI. But in the literature, some authors refer to ML as a synonymous of AI. Because of this possible confusion, in this document, ML and AI are any learning that is performed by a machine in order to perform non-human decision making (that is, decision making not performed by a human although possibly using human input). Such learning may use, e.g., statistical and/or probabilistic techniques and/or evolutionary techniques, symbolic processing, formal logic, expert systems, and the like, including combinations of these.

Specifically, machine learning 140 is performed to establish new scores 145, i.e., the effectiveness of the EOR materials in this specific reservoir condition. These new scores are stored in the EOR DB 200 and then used in the next Machine Learning run. In this way, the system and particularly the EOR reservoir advisor 50, which is based on AI, is always evolving.

Based on these new scores established in block 145, EOR additives, suitable for a specific reservoir condition, are shortlisted. See block 150. Block 140 uses information from the EOR DB 200 and the defined weights. At the same time, the EOR additive material properties may be displayed (see block 145), e.g., on a GUI (e.g., see GUI 280 in FIG. 2B), which relate to the EOR additive effectiveness. For example, for polymer flooding 70-1, the melting point of the selected polymer, chain length, chain topology (linear, branch, star, homopolymer/copolymer, and the like) may be parameters. These parameters are useful to design new materials. See, for instance, the patent application entitled "NANOPARTICLE DESIGN FOR ENHANCED OIL RECOVERY", Disclosure Number YOR820150325, filed on Dec. 18, 2015, published as U.S. Publication No. 2017/0174978 on Jun. 22, 2017, U.S. Ser. No. 14/973,785. The shortlisted EOR additives 70 and the respective EOR additive materials properties are generally displayed in a GUI (e.g., the GUI 280 in FIG. 2B). The display in the GUI of the shortlisted EOR additives 70 and the respective EOR additive materials properties are so that the user can adjust the scores in block 155.

In block 155 a user can modify scores based on his or her experience. By modifying the scores, the user also modifies the EOR materials being used. The idea here comes from the fact that the Oil & Gas industry is a very conservative industry. Here an expert (e.g., a very experienced Reservoir Engineer) could disagree what the EOR advisor proposed, and the expert changes the scores to deploy different EOR materials, based on his or her knowledge. These new scores are stored in the EOR DB and then used in the next machine learning run. In this way, the system based on AI may be always evolving.

Once the Machine Learning technique ranks the shortlisted EOR materials (and the user modifies the scores in block 155), one or more signals may be sent (block 160) to a set of actuators or mixers (e.g., valves) to provide the EOR material with the highest score (e.g., the highest enhanced oil recovery effectiveness for the reservoir condition at that moment) to the reservoir or to mix the EOR additives 70 together. The output for the actuators may be the EOR material(s) shortlisted with a specific concentration. More specifically, the EOR materials/concentrations can be converted into some output that would cause the actuators/mixers/both at or near the injection well to provide and use the EOR materials at their corresponding concentrations at the oil reservoir. Actuators/mixers should be near the injection wells. In particular, mixers usually are relatively large. Once the materials are mixed with water or gas, they are injected into the oil reservoir using the injection wells. If the user (for example a reservoir engineer) chooses (see block 155) different scores for the shortlisted EOR materials selected by the machine learning, then the system can be overridden or updated to provide a new ranking.

Referring to FIG. 2B, FIG. 2B illustrates a block diagram of possible internal configuration of the elements of a system 290 using the EOR reservoir advisor in FIG. 2A. The system 290 comprises a computer system 205 coupled to one or more displays 276 and one or more user input devices 260. The display(s) include a GUI 280. The user input device(s) may include mice, trackballs, keyboards, touch devices, or any other device to allow a user to interact with the computer system 205, e.g., via the GUI 280.

The computer system 205 includes one or more memories 245, one or more processors 210, display circuitry 275, one or more user input interfaces (I/Fs) 277, one or more network interfaces 240 and one or more actuator (or mixer) interfaces 250, all interconnected through one or more buses 246. The buses 246 may be address, data, and/or control buses and may be implemented using many different techniques, such as traces on a board, metallization in a semiconductor, and the like. The one or more memories 245 comprise computer readable code 285 comprising the EOR reservoir advisor 50, and also comprise the EOR database 200. Note that the memories 245 may also comprise other elements, not shown in FIG. 2B, such as the databases 360, 460 in FIGS. 3 and 4 respectively, an operating system, and the like. The computer system 205 is in this example connected to one or more displays 276, driven by the display circuitry 275. The one or more user input interfaces 277 comprise circuitry to allow a user to provide input to the computer system 205, such as via a wireless interface (e.g., Bluetooth, which is a short range wireless connectivity standard) or a wired interface to and from input devices such as a mouse, keyboard, and the like.

The one or more network interfaces 240 may be wired or wireless and may be used to send information toward one or more actuators 265 and/or one or more mixers 265, e.g., using one or more networks (not shown). For this example, the computer system 205 and system 290 could be remote from the location of the actuator(s) 265 and mixer(s) 266.

The information could be defined to cause the actuator(s) 265 and mixer(s) 266 to set an amount of the EOR material 70, for instance, to be used. In another example, the computer system 205 and system 290 are located near the actuator(s) and/or mixer(s) 265 and the actuator (or mixer) interface(s) 250 could be used to control directly the actuator (s) 265 or mixer(s) 266.

The EOR reservoir advisor 50 comprises computer readable code, which when accessed and executed by the one or more processors 210 causes the computer system to perform the operations described herein, such as those described in the figures. The EOR reservoir advisor 50 may be implemented in whole or part in circuitry 215, which itself may implement the one or more memories and the one or more processors. For instance, the EOR reservoir advisor 50 may be implemented in an integrated circuit or as part of a programmable logic device.

Figure 3:
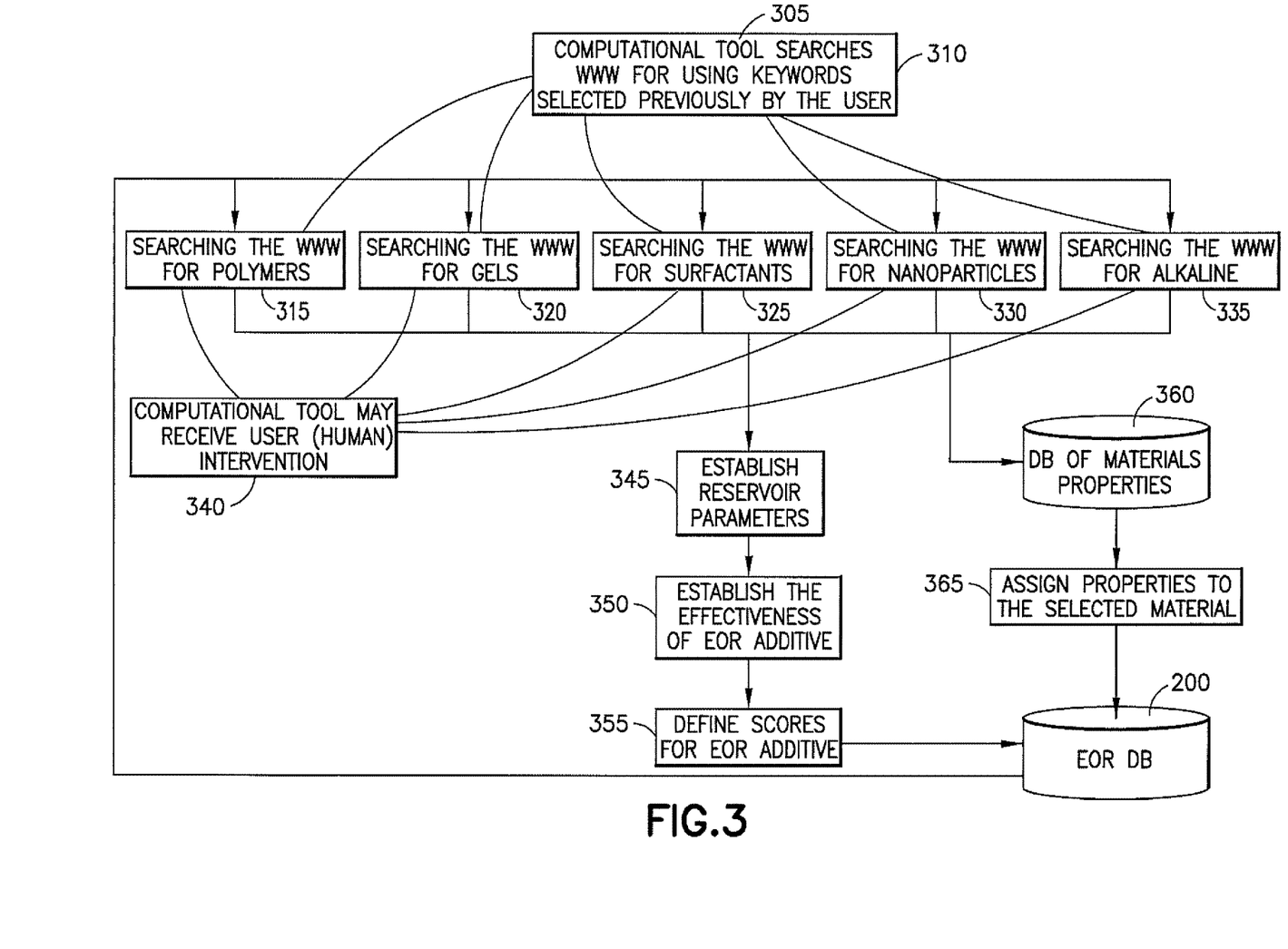
FIG. 3 is a logic flow diagram illustrating one embodiment for building an EOR materials database, and illustrates the operation of an exemplary method or methods, a result of execution of computer program instructions embodied on a computer readable memory, functions performed by logic implemented in hardware, and/or interconnected means for performing functions in accordance with exemplary embodiments.

Concerning the EOR DB 200, there are a number of ways this database could be built. FIG. 3 is a logic flow diagram illustrating one embodiment for building an EOR database. This figure further illustrates the operation of an exemplary method or methods, a result of execution of computer program instructions embodied on a computer readable memory, functions performed by logic implemented in hardware, and/or interconnected means for performing functions in accordance with exemplary embodiments.

A computational tool 305 searches (block 310) in the World Wide Web using keywords selected previously by the user. The computational tool 305 may be part of the EOR reservoir advisor 50 or separate from the same. Such a tool 305 may include an information extraction (IE) tool, where IE is the task of automatically extracting structured information from unstructured and/or semi-structured machine-readable documents. In most of the cases, this activity concerns processing human language texts by means of natural language processing (NLP). There are a lot of open source NLP tools such as Stanford's Core NLP Suite, Natural Language Toolkit, Apache Lucene and Solr, Apache OpenNLP, GATE, and SystemT from IBM.

The searches performed by the computational tool are illustrated by the following exemplary search strings: polymer flooding+EOR (block 315); gels+EOR (block 320); surfactants+EOR (block 325); nanoparticles+EOR (block 330); and alkaline+EOR (block 335). Other possible keywords combinations may be used such as surfactants+Enhanced Oil Recovery in block 325. Many other combinations are possible. At this point, it is possible for the computational tool to receive human intervention, see block 340, in order to select other combinations of keywords equivalent to enhanced oil recovery.

Once the material for any one or more of polymer flooding, gel flooding, surfactant flooding, nanoparticle flooding, or alkaline flooding is found, the computational tool accesses a database 360 with the material properties for these EOR materials 70. The computational tool then assigns (block 365) properties to a selected material, e.g., stored in a vector of material properties. For example, for polymers, the computational tool stores the relevant information in a vector in block 365: chain length, melting point, glass transition temperature, water solubility, viscosity, molecular weight, radius of gyration, polymer architecture (homopolymer/copolymer, linear/non-linear, organic/inorganic or organic and inorganic) and/or degradation (biodegradation, UV degradation, pH, salts and temperature). Qualifiers for copolymers architecture may include one or more of the following: unspecified, statistical, random, alternating, periodic, block, and/or graft. Qualifiers for Non-Linear chains architecture may include one or more of the following: blend, comb, complex, cyclic, branch, network, interpenetrating network, semi-interpenetrating network and stars.

In block 345, the reservoir parameters are established. The computational tool 305 typically performs the operations in block 345, but if the computational tool was not able to perform this task, the human intervention would be needed. These reservoir parameters include one or more of the following: temperature, pressure, oil viscosity, oil density (API), water salinity, type of rock formation (sandstone, carbonate, and the like), permeability, rock porosity, presence of fractures, oil and water saturation (fraction).

In block 350, the effectiveness of EOR additive is established. The computational tool 305 typically performs the operations in block 350, but if the computational tool was not able to perform this task, the human intervention would be needed. In block 350, the incremental oil production after EOR additive is employed for an EOR process for the specifically established reservoir. The effectiveness of EOR additives is determined based on WWW information (could be from scientific publications in journals, conferences, and the like).

In block 355, scores are defined for the EOR additive or additives. The computational tool 305 typically performs the operations in block 355, but if the computational tool was not able to perform this task, the human intervention would be needed. The score should be proportional to the incremental oil production after the EOR is employed. The score is thus indicative of the effectiveness of EOR additive. These scores are stored in the EOR DB 200. Concerning the EOR DB 200, this database stores the scores of an EOR additive for a specific reservoir condition and stores the properties assigned in block 365.

After this loop is completed, the computational tool starts again performing a search in the World Wide Web using keywords selected previously by the users in blocks 313-335, e.g., using other possible keywords combinations. In this way, the EOR database 200 is built but may be always evolving. These procedures may be repeated frequently in order to keep the EOR DB updated.

Figure 4:
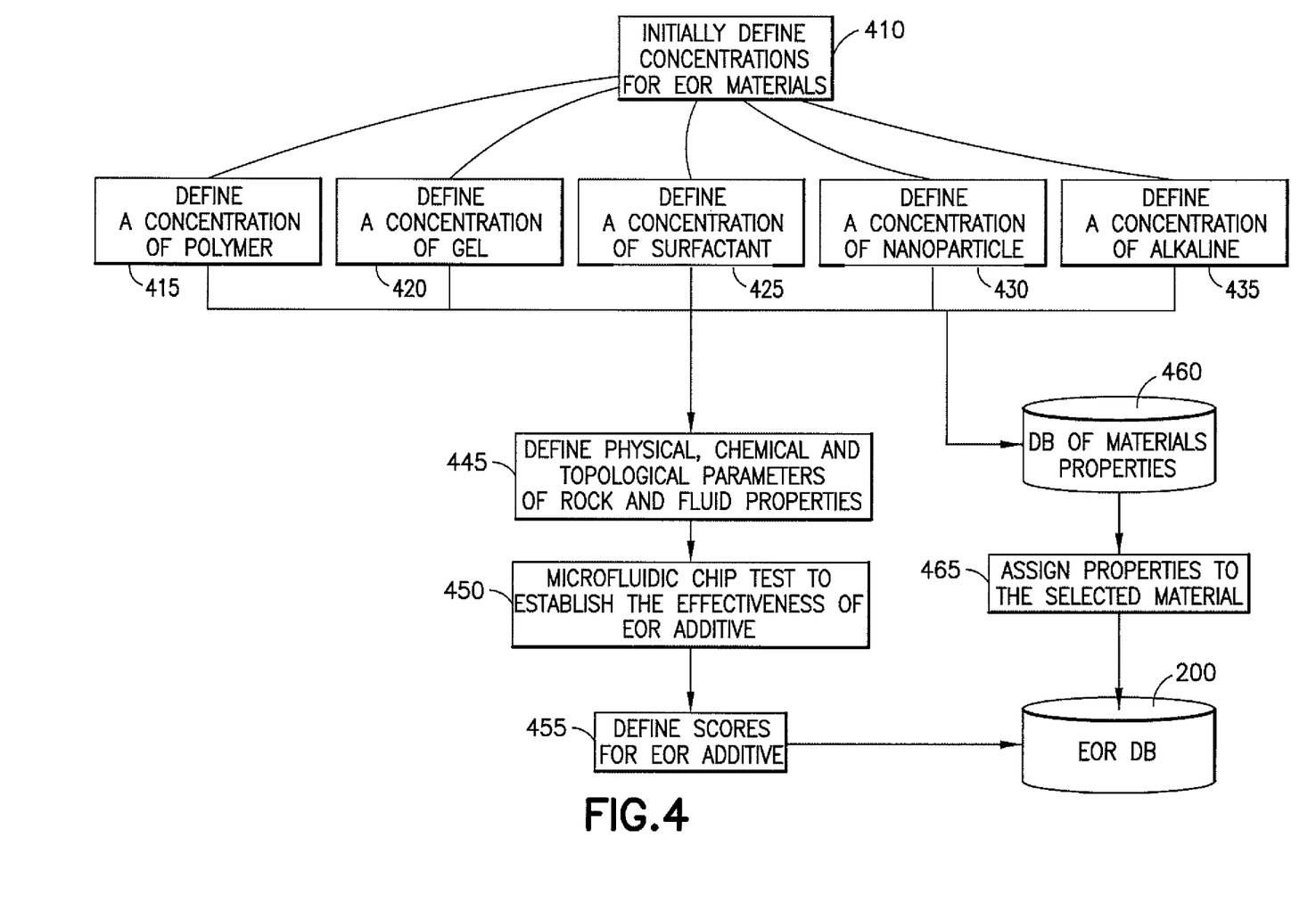
FIG. 4 is a logic flow diagram illustrating another embodiment for building an EOR materials database, and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 3 illustrated one exemplary embodiment for building an EOR database. FIG. 4 is a logic flow diagram illustrating another embodiment for building an EOR database. This figure also illustrates the operation of an exemplary method or methods, a result of execution of computer program instructions embodied on a computer readable memory, functions performed by logic implemented in hardware, and/or interconnected means for performing functions in accordance with exemplary embodiments.

In block 410, a user initially defines concentrations for EOR materials. Such initial definition may include initially defining concentrations for one or more of the following: polymer (block 415); gel (block 420); surfactant (block 425); nanoparticle (block 430); and/or alkaline (block 435). In principle, the blocks 445, 450, and 455 are typically performed for a single EOR material, but it is also possible consider as a combination of these materials, such as a combination of alkaline, polymer and surfactant (e.g., ASP flooding) for these blocks.

A computational tool accesses a database 460 with the material properties, and then in block 465 assigns properties to the selected materials, e.g., in a vector of materials properties. Block 465 is the same as block 365 above. For both blocks, the computational tool 305 accesses a materials DB 460 (or DB 360 in FIG. 3) and then assigns materials properties for each of the materials from blocks 415-435 (or blocks 315-335 in FIG. 3). For example for polymers, the following may be used in the vector: chain length, melting point, glass transition temperature, water solubility, viscosity, molecular weight, radius of gyration, polymer architecture (homopolymer/copolymer, linear/non-linear, organic/inorganic or organic and inorganic) and degradation (biodegradation, UV degradation, pH, salts and temperature). Qualifiers for copolymers architecture include one or more of the following: unspecified, statistical, random, alternating, periodic, block, and/or graft. Qualifiers for non-linear chains architecture include one or more of the following: blend, comb, complex, cyclic, branch, network, interpenetrating network, semi-interpenetrating network and stars. These vectors are stored in the EOR DB 200.

In block 445, the physical/chemical and topological parameters of rock and fluid properties are defined. An experienced experimentalist typically defines these properties, especially the fluid properties. The topological parameters of rock and how these are transferred to a microfluidic/nanofluidic chip were described in detail in the U.S. Pat. No. 9,310,285. Such parameters and properties may comprise one or more of the following: the rock topological features and the surface rock chemical composition, which may be transferred to the microfluidic/nanofluidic chip. The 2D or 3D micro/nanofluidic chip topology mimics the rock topology, i.e., shows the same permeability, tortuosity and other rock topology parameters. At the same time, the physical properties of fluids are established, using one or more of the following: temperature, pressure, oil viscosity, oil/water saturation, and water salinity.

In block 450, micro-nanofluidic experimental tests are performed with two identical micro- and/or nanofluidic chips: one will be tested with just water flooding, and the other with water plus the EOR additive 70 with the respective concentration. Nanofluidic is a terminology used to addresses the question that some channels or distances between obstacles, such as micropillars, can be in the range of nanometers. The chip itself is not necessarily at the nanometer scale range, but some features of the microfluidic chip can be. The effectiveness of EOR material is established by comparing the incremental oil extraction between the two micro- and/or nanofluidic chips.

In block 455, scores are defined for the EOR additives 70. Typically, an experienced experimentalist professional defines the scores. In principle, however, these tasks can be automatized and performed by a robot. The scores should be proportional to the incremental oil production after the EOR is employed. The scores are thus indicative of the effectiveness of EOR additive 70.

The EOR DB 200 database stores the scores of an EOR additive (or a set of the same) for a specific reservoir condition. The EOR DB 200 also stores the properties assigned in block 465.

As described previously, a machine learning process (e.g., see block 140 of FIG. 2A) may use multiple sources of information for enhanced oil recovery (EOR) materials to be used for a defined oil reservoir. Such sources could include the WWW searches performed in FIG. 3, the microfluidics experiments performed in FIG. 4, and user feedback such as that performed in block 155 of FIG. 2A, where a user modifies the scores for the shortlisted EOR additives based on his or her experiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following abbreviations that may be found in the specification and/or the drawing figures are defined as follows:
 2D two dimensional
 3D three dimensional
 AI artificial intelligence
 ASP alkaline, surfactant and polymer
 DB database
 EOR enhanced oil recovery
 GUI graphic user interface
 IE information extraction
 I/F interface
 ML machine learning
 NLP natural language processing
 OOIP original-oil-in place
 UV ultraviolet
 WWW world wide web

What is claimed is:

1. A method, comprising:
performing a machine learning process using one or more sources of information for enhanced oil recovery (EOR) materials to be used for an EOR process on a defined oil reservoir, where performance of the machine learning process produces an output comprising an indication of one or more EOR materials and their corresponding concentrations to be used in the EOR process;
where performing the machine learning process uses multiple sources of information for the EOR materials to be used for the defined oil reservoir, where the machine learning process uses defined weights to weight EOR efficiencies from the multiple sources of information; and
outputting the indication of the one or more EOR materials and their corresponding concentrations to be used in the EOR process.

2. The method of claim 1, further comprising converting the indication of the one or more EOR materials and their corresponding concentrations to be used in the EOR process into information defined to cause one or more actuators or one or more mixers or both to provide the one or more EOR materials at their corresponding concentrations at the defined oil reservoir for use by the EOR process.

3. The method of claim 1, wherein the one or more EOR materials are in a list, and wherein the method further comprises allowing a user to modify EOR efficiencies associated with the EOR materials in the list.

4. The method of claim 1, where the defined oil reservoir is defined based on information comprising physical and chemical conditions at the oil reservoir.

5. The method of claim 1, where the EOR process is defined from a selected one of multiple options, and wherein the one or more EOR materials are materials corresponding to the selected option.

6. The method of claim 1, where the multiple sources of information for the EOR materials to be used for a defined oil reservoir comprises two or more of the following sources: (i) World Wide Web (WWW) search analyses, (ii) microfluidics experiments, (iii) artificial intelligence analyses; and (iv) user feedback.

7. A computer system, comprising:
one or more memories having computer readable code;
one or more processors, wherein the one or more processors, in response to retrieving and executing the computer readable code, cause the computer system to perform the following:
performing a machine learning process using one or more sources of information for enhanced oil recovery (EOR) materials to be used for an EOR process on a defined oil reservoir, where performance of the machine learning process produces an output comprising an indication of one or more EOR materials and their corresponding concentrations to be used in the EOR process; and outputting the indication of the one or more EOR materials and their corresponding concentrations to be used in the EOR process; and converting the indication of the one or more EOR materials and their corresponding concentrations to be used in the EOR process into information defined to cause one or more actuators or one or more mixers or both to provide the one or more EOR materials at their corresponding concentrations at the defined oil reservoir for use by the EOR process.

8. The computer system of claim 7, wherein:

the one or more EOR materials are in a list;

the one or more processors, in response to retrieving and executing the computer readable code, cause the computer system to perform the following: allowing a user to modify EOR efficiencies associated with the EOR materials in the list; and converting further comprises converting, based on the modified EOR efficiencies, the indication of the one or more EOR materials and their corresponding concentrations to be used in the EOR process into information defined to cause one or more actuators or one or more mixers or both to provide the one or more EOR materials at their corresponding concentrations at the defined oil reservoir for use by the EOR process.

9. The computer system of claim 7, wherein the one or more EOR materials are in a list, and wherein the one or more processors, in response to retrieving and executing the computer readable code, cause the computer system to perform the following: allowing a user to modify EOR efficiencies associated with the EOR materials in the list.

10. The computer system of claim 7, where the defined oil reservoir is defined based on information comprising physical and chemical conditions at the oil reservoir.

11. The computer system of claim 7, where performing the machine learning process uses multiple sources of information for the EOR materials to be used for the defined oil reservoir, where the machine learning process uses defined weights to weight EOR efficiencies from the multiple sources of information.

12. The computer system of claim 11, where the multiple sources of information for the EOR materials to be used for a defined oil reservoir comprises two or more of the following sources: (i) World Wide Web (WWW) search analyses, (ii) microfluidics experiments, (iii) artificial intelligence analyses; and (iv) user feedback.

13. A computer system, comprising:

one or more memories having computer readable code;

one or more processors, wherein the one or more processors, in response to retrieving and executing the computer readable code, cause the computer system to perform the following:

performing a machine learning process using one or more sources of information for enhanced oil recovery (EOR) materials to be used for an EOR process on a defined oil reservoir, where performance of the machine learning process produces an output comprising an indication of one or more EOR materials and their corresponding concentrations to be used in the EOR process, where the EOR process is defined from a selected one of multiple options, and wherein the one or more EOR materials are materials corresponding to the selected option;

allowing a user to select one of the multiple options and performing the machine learning process based on the selected option; and outputting the indication of the one or more EOR materials and their corresponding concentrations to be used in the EOR process.

14. The computer system of claim 13, wherein the multiple options comprise one or more of the following options: polymer flooding; hydrogels; surfactants; alkalines; or nanoparticles.

15. The computer system of claim 14, wherein information from the one or more sources of information is stored in a database.

16. The computer system of claim 15, wherein the one or more processors, in response to retrieving and executing the computer readable code, cause the computer system to perform determining the information in the database by performing operations comprising:

searching a world-wide web for EOR materials for each of the multiple options;

assigning properties to EOR materials found during the searching;

establishing reservoir parameters;

establishing effectiveness of EOR materials based on the reservoir parameters, the multiple options, the EOR materials found for each of the multiple options, and the properties of the EOR materials found for each of the multiple options; and defining, based on the established effectiveness, EOR efficiencies for the EOR materials, each EOR efficiency proportional to an incremental oil production after the EOR process is employed using a corresponding EOR material for a reservoir with the established reservoir parameters.

17. The computer system of claim 15, wherein the one or more processors, in response to retrieving and executing the computer readable code, cause the computer system to perform determining the information in the database by performing operations comprising:

defining a concentration for each of the multiple options;

assigning properties to EOR materials;

defining physical, chemical and topological parameters of rock and fluid properties;

establishing an effectiveness of EOR materials by performing chip tests using one of microfluidic or nanofluidic chips, wherein the chip tests use two identical chips, where one chip is tested with water flooding and the other chip is tested with water flooding and a specific EOR material and the effectiveness of the specific EOR material is established by comparing incremental oil extraction between the two identical chips; and defining, based on the established effectiveness, EOR efficiencies for the EOR materials, each EOR efficiency proportional to an incremental oil production after the EOR process is employed using a corresponding EOR material for a reservoir with the established reservoir parameters.

\* \* \* \* \*